(12) United States Patent
Aizawa

(10) Patent No.: US 8,078,941 B2
(45) Date of Patent: Dec. 13, 2011

(54) MEMORY SYSTEM, MEMORY SYSTEM CONTROLLER, AND A DATA PROCESSING METHOD IN A HOST APPARATUS

(75) Inventor: Hideo Aizawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1126 days.

(21) Appl. No.: 11/669,187

(22) Filed: Jan. 31, 2007

(65) Prior Publication Data

US 2007/0234142 A1    Oct. 4, 2007

Related U.S. Application Data

(63) Continuation of application No. PCT/JP2005/022398, filed on Nov. 30, 2005.

(30) Foreign Application Priority Data

Nov. 30, 2004   (JP) ................................. 2004-347595

(51) Int. Cl.
*G11C 29/00* (2006.01)
(52) U.S. Cl. ........................................ 714/773; 714/774
(58) Field of Classification Search .................. 714/773, 714/774
See application file for complete search history.

(56) References Cited

U.S. PATENT DOCUMENTS

| | | | |
|---|---|---|---|
| 4,706,249 A | 11/1987 | Nakagawa et al. | |
| 5,740,177 A | 4/1998 | Miyata | |
| 6,351,412 B1 * | 2/2002 | Nozoe et al. | 365/185.09 |
| 6,651,212 B1 * | 11/2003 | Katayama et al. | 714/763 |
| 6,691,205 B2 * | 2/2004 | Zilberman | 711/103 |
| 6,769,087 B2 * | 7/2004 | Moro et al. | 714/763 |
| 7,389,465 B2 * | 6/2008 | Radke et al. | 714/755 |

FOREIGN PATENT DOCUMENTS

| | | |
|---|---|---|
| EP | 1 008 936 A | 6/2000 |
| JP | 2000-173289 A | 6/2000 |
| JP | 2001-175542 | 6/2001 |
| JP | 2004-280556 | 10/2004 |

OTHER PUBLICATIONS

Office Action issued on Nov. 30, 2010, in Japanese Patent Application No. 2004-347595 (with English Translation).

* cited by examiner

*Primary Examiner* — Stephen Baker
(74) *Attorney, Agent, or Firm* — Oblon, Spivak, McClelland, Maier & Neustadt, L.L.P.

(57) ABSTRACT

A memory system includes code data generating section which generates code data based on write data. A nonvolatile semiconductor memory stores the write data and the code data for the write data and outputs read data and the code data for the read data. An error correcting section is configured to correct an error bit included in the read data using the read data and the code data for the read data, and outputs the read data which includes the error bit in accordance with a setting. An interface section receives the write data from outside of the memory system, and outputs the read data to outside of the memory system.

14 Claims, 11 Drawing Sheets

| Pin No. | Signal |
|---|---|
| Pin 1 | Card detection/data 3 (DAT3) |
| Pin 2 | Command (CMD) |
| Pin 3 | Vss |
| Pin 4 | Vdd |
| Pin 5 | Clock (CLK) |
| Pin 6 | Vss |
| Pin 7 | Data 0 (DAT0) |
| Pin 8 | Data 1 (DAT1) |
| Pin 9 | Data 2 (DAT2) |

| Operation mode | Pin name | Signal |
|---|---|---|
| SD 4-bit mode | DAT 3 | CD/DATA |
| | DAT 2 | DATA |
| | DAT 1 | DATA |
| | DAT 0 | DATA |
| | CMD | Command/Response |
| | CLK | Clock |
| SD 1-bit mode | DAT 3 | Reserve |
| | DAT 2 | Non-use |
| | DAT 1 | Non-use |
| | DAT 0 | DATA |
| | CMD | Command/Response |
| | CLK | Clock |
| SPI mode | DAT 3 | Chip select CS |
| | DAT 2 | Non-use |
| | DAT 1 | Non-use |
| | DAT 0 | DATA OUT |
| | CMD | DATA IN |
| | CLK | Clock |

FIG 6

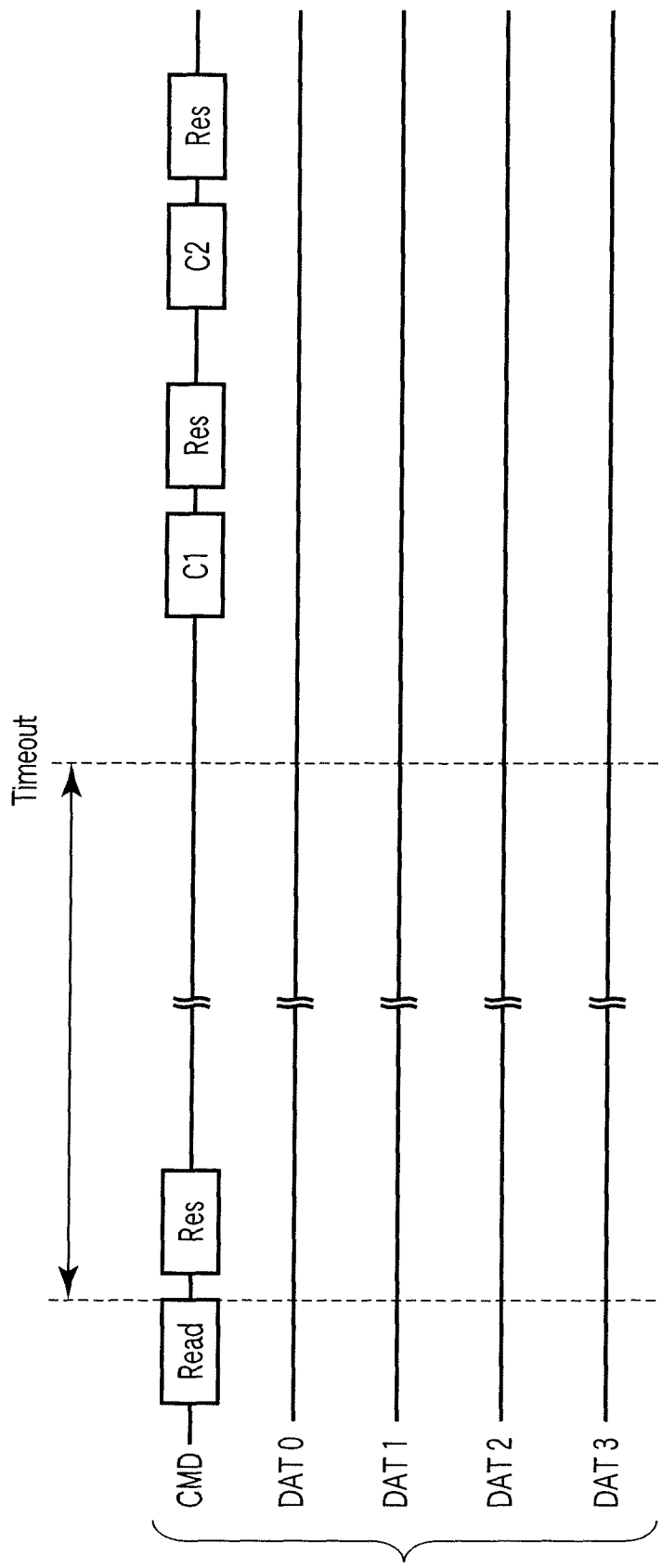
F I G. 14

MEMORY SYSTEM, MEMORY SYSTEM CONTROLLER, AND A DATA PROCESSING METHOD IN A HOST APPARATUS

CROSS-REFERENCE TO RELATED APPLICATIONS

This is a Continuation Application of PCT Application No. PCT/JP2005/022398, filed Nov. 30, 2005, which was published under PCT Article 21(2) in English.

This application is based upon and claims the benefit of priority from prior Japanese Patent Application No. 2004-347595, filed Nov. 30, 2004, the entire contents of which are incorporated herein by reference.

BACKGROUND OF THE INVENTION

1. Field of the Invention

The present invention relates to a memory system including a memory card, and more particularly to a memory system in which a nonvolatile semiconductor memory is mounted. Further, the present invention relates to a memory system controller mounted in a memory system and a data processing method in a host apparatus.

2. Description of the Related Art

A memory card, e.g., an SD™ memory card, is used as a storage medium of a host apparatus such as a personal computer. Of such memory cards, there is a memory card in which an error correction circuit (an ECC circuit) is mounted (see, e.g., Jpn. Pat. Appln. KOKAI Publication No. 2000-173289, p. 4, FIG. 1).

The error correction circuit generates code data which is an error correction code based on write target data at the timing of writing the data. Further, the error correction circuit reads read target data as well as code data corresponding to this data at the time of reading the data. Furthermore, the error correction circuit performs error correction processing with respect to the read target data based on this read code data. In this manner, the conventional memory card improves reliability of storage data by mounting the error correction circuit therein.

The error correction circuit mounted in a host apparatus may have an error correction capability superior to that of the error correction circuit mounted in a memory card in some cases. In such a case, performing error correction processing by the error correction circuit in the host apparatus can correct more error bits than that in case of performing error correction processing by the error correction circuit in the memory card.

However, in the conventional memory card, when an uncorrectable data error is detected by the error correction circuit in the memory card during a data read operation, this data is not output. Therefore, even if an error can be corrected by the error correction circuit in the host apparatus but cannot be corrected by the error correction circuit in the memory card, the error cannot be corrected.

BRIEF SUMMARY OF THE INVENTION

According to a first aspect of the present invention, there is provided a memory system comprising: a code data generating section which generates code data based on write data; a nonvolatile semiconductor memory which stores the write data and the code data for the write data and outputs read data and the code data for the read data; an error correcting section which is configured to correct an error bit included in the read data using the read data and the code data for the read data, and outputs the read data which includes the error bit in accordance with a setting; and an interface section which receives the write data from outside of the memory system, and outputs the read data to outside of the memory system.

According to a second aspect of the present invention, there is provided a memory system controller which controls a nonvolatile semiconductor memory mounted in a memory system, comprising: a code data generating section which generates code data based on write data; an error correcting section which is configured to correct an error bit included in read data using the read data and the code data for the read data which are read from the nonvolatile semiconductor memory, and outputs the read data which includes the error bit in accordance with a setting; and an interface section which receives the write data from outside of the memory system, and outputs the read data to outside of the memory system.

According to a third aspect of the present invention, there is provided a data processing method in a host apparatus into which a memory system is inserted, the memory system comprising a nonvolatile semiconductor memory and a memory system controller controlling the nonvolatile semiconductor memory, the method comprising: generating code data based on write data; instructing the memory system to write the write data and the code data for the write data into the nonvolatile semiconductor memory; instructing the memory system to read read data and the code data for the read data from the nonvolatile semiconductor memory; judging an operation mode of the memory system; and correcting an error bit included in the read data using the read data and the code data for the read data when the operation mode is a first mode.

BRIEF DESCRIPTION OF THE SEVERAL VIEWS OF THE DRAWING

FIG. 6 is an explanatory view showing a relationship between settable operation modes and pin assignment of the memory card according to the first to third embodiments;

FIG. 14 is a timing chart showing transmission/reception of signals between the memory card and the host apparatus according to the second embodiment.

DETAILED DESCRIPTION OF THE INVENTION

Figures 1, 2:
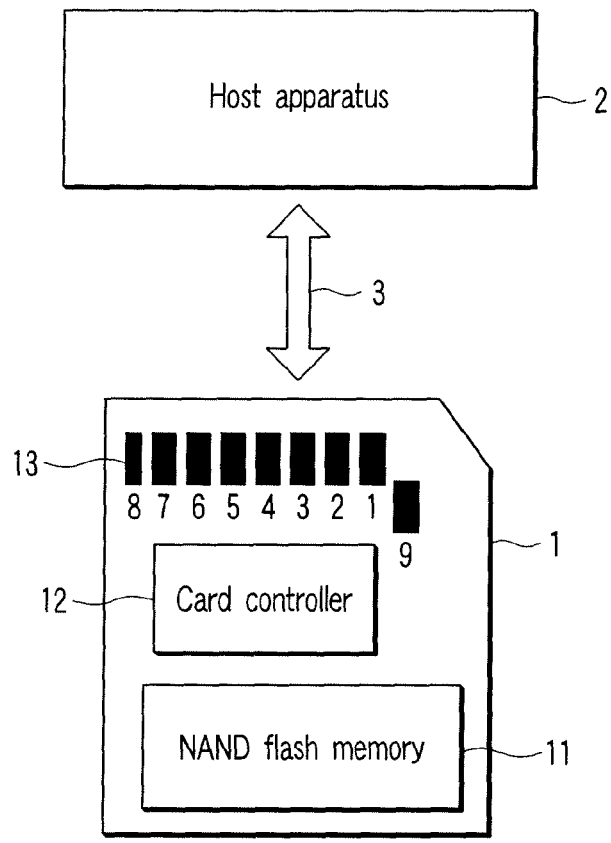
FIG. 1 is a schematic view showing a basic configuration of a memory card according to first to third embodiments of the present invention.
FIG. 2 is an explanatory view showing allocation of signals to signal pins of the memory card according to the first to third embodiments.

A memory system, a memory system controller and a control method of the memory system according to embodiments of the present invention will now be described hereinafter with reference to the accompanying drawings. It is to be noted that like reference numerals denote constituent parts having substantially the same function and structure, and a tautological description will be given as required.

Further, an explanation will be given while taking an SD™ memory card as an example of the memory system according to embodiments of the present invention. Of course, each embodiment of the present invention can be applied to any other memory card.

First Embodiment

A first embodiment of the present invention will now be described with reference to FIGS. 1 to 12.

FIG. 1 shows a basic configuration of a memory card 1. The memory card 1 is attached in a card slot of a host apparatus such as a personal computer, thereby operates upon receiving power, and performs processing according to access from the host apparatus. That is, the memory card 1 has a NAND-type flash memory 11 and a controller 12 mounted on a circuit substrate.

The NAND-type flash memory 11 is a nonvolatile semiconductor memory. In the NAND-type flash memory 11, writing and reading of data are performed in units called page, for example. Furthermore, in the NAND-type flash memory 11, regular erasing is carried out in units of block consisting of pages, for example. This NAND-type flash memory 11 is manufactured by using a process technology of, e.g., 0.09 µm. That is, a design rule of the NAND-type flash memory 11 is less than 0.1 µm.

It is to be noted that the NAND-type flash memory 11 may be a binary memory which stores information of one bit in one memory cell or a multi-value memory which stores information of two or more bits in one memory cell. Moreover, in order to provide the memory card 1 as a practically effective product, it is desirable for the NAND-type flash memory 11 to have a storage capacity of 1 Gbyte or more.

The controller 12 is configured to manage a physical state in the NAND-type flash memory 11. For example, the controller 12 holds a logical-physical transform table showing a correspondence relationship between a logical block address and a physical block address or a table showing whether each physical block has been already allocated to a given logical block.

Signal pins 13 are electrically connected to a connector pin of the host apparatus 2 when the memory card 1 is inserted into the card slot. FIG. 2 shows allocation of signals to the signal pins 13. Data signals (DAT 0 to DAT 3) are allocated to pins P1, P7, P8 and P9. Additionally, the pin P1 is also allocated to a card detection signal. A pin P2 is allocated to a command (CMD), and a pin 5 is allocated to a clock. A ground potential (Vss) is supplied to pins P3 and P6, and a power supply potential (Vdd) is supplied to a pin P4.

In such a configuration, when the memory card 1 is inserted in the card slot of the host apparatus 2, communication between the memory card 1 and the host apparatus 2 is performed through the signal pins 13. For example, in case of writing data in the NAND-type flash memory 11 of the memory card 1, the controller 12 fetches a write command supplied to the pin P2 as a serial signal in synchronization with a clock signal fed to the pin PS from the host apparatus 2.

Figure 3:
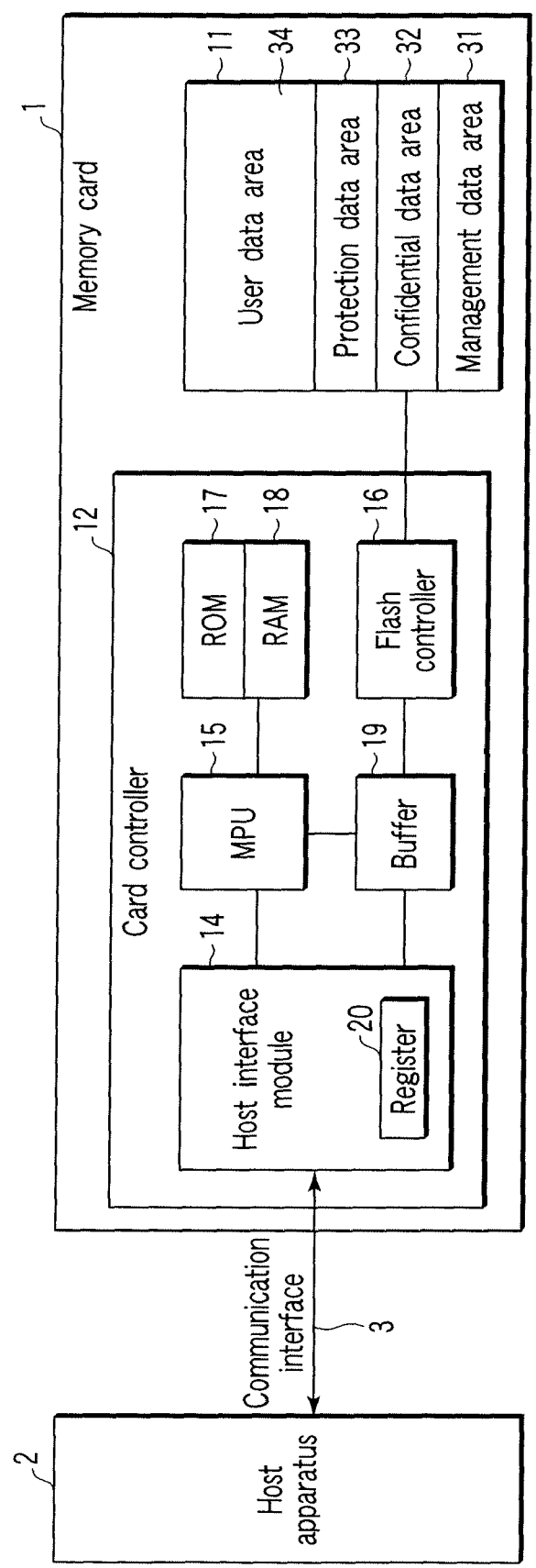
FIG. 3 is a block diagram showing a hard configuration of the memory card according to the first to third embodiments.

FIG. 3 is a block diagram showing a hard configuration of the memory card according to this embodiment. The host apparatus 2 is connected to the memory card 1 through a communication interface 3. The host apparatus 2 includes hardware and software required to access the memory card 1.

As described above, the memory card 1 includes the NAND-type flash memory 11 and the card controller 12. An erasing block size (a block size as an erasing unit) of the NAND-type flash memory 11 is set to a predetermined size (e.g., 256 kbytes [here, k is 1024]). Further, writing data in this NAND-type flash memory 11 and reading data from this NAND-type flash memory 11 are carried out in units called page (e.g., 2 kbytes). The card controller 12 has a host interface module 14, a micro processing unit (MPU) 15, a flash controller 16 (a memory control section), a read only memory (ROM) 17, an random access memory (RAM) 18 and a buffer 19.

Figure 4:
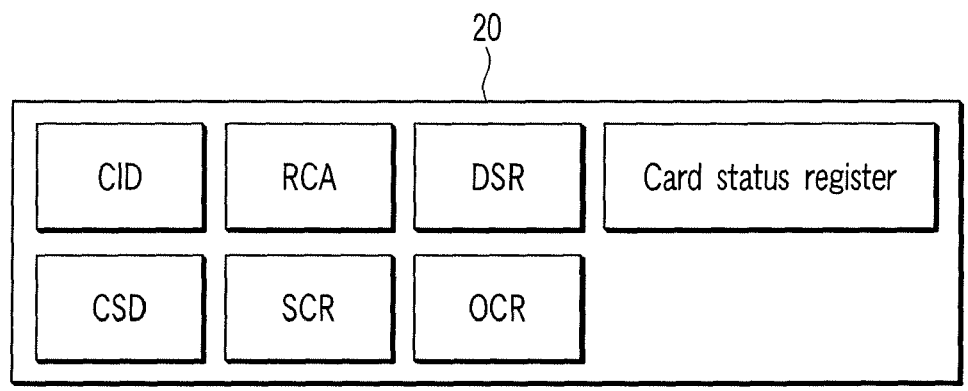
FIG. 4 is a view showing a detailed configuration of a register section in the memory card according to the first to third embodiments.

The host interface module 14 performs interface processing between the card controller 12 and the host apparatus 2, and includes a register section 20. FIG. 4 shows a detailed configuration of the register section 20. The register section 20 has a card status register and various kinds of registers, i.e., CID, RCA, DSR, CSD, SCR and OCR.

These registers are defined as follows. The card status register is used in a regular operation, and stores, e.g., error information therein. CID, RCA, DSR, CSD, SCR and OCR are mainly used in initialization of the memory card. CID (card identification number) stores an individual number of the memory card. RCA (relative card address) stores a relative card address (which the host apparatus dynamically determines at the time of initialization). DSR (driver stage register) stores a bus driving power or the like of the memory card. CSD (card specific data) stores a characteristic parameter value of the memory card. SCR (SD configuration data register) stores a data arrangement of the memory card. Furthermore, OCR (operation condition register) stores an operating voltage in case of a memory card having a restricted working range voltage.

The MPU 15 controls operations of the entire memory card 1. The MPU 15 executes predetermined processing based on firmware (a control program) stored in the ROM 17 when, e.g., the memory card 1 receives power, thereby creating various kinds of tables in the RAM 18. Moreover, the MPU 15 receives a write command, a read command and an erase command from the host apparatus 2, and then executes predetermined processing to the NAND-type flash memory 11 or controls data transfer processing through the buffer 19.

The ROM 17 stores a control program or the like controlled by the MPU 15. The RAM 18 is used as a working area of the MPU 15, and stores the control program or various kinds of tables. Additionally, the flash controller 16 performs interface processing between the card controller 12 and the NAND-type flash memory 11.

The buffer 19 temporarily stores a fixed quantity of data (e.g., a quantity corresponding to one page) when writing data transmitted from the host apparatus 2 into the NAND-type flash memory 11, or temporarily stores a fixed quantity of data when transmitting data read from the NAND-type flash memory 11 to the host apparatus 2.

Figure 5:
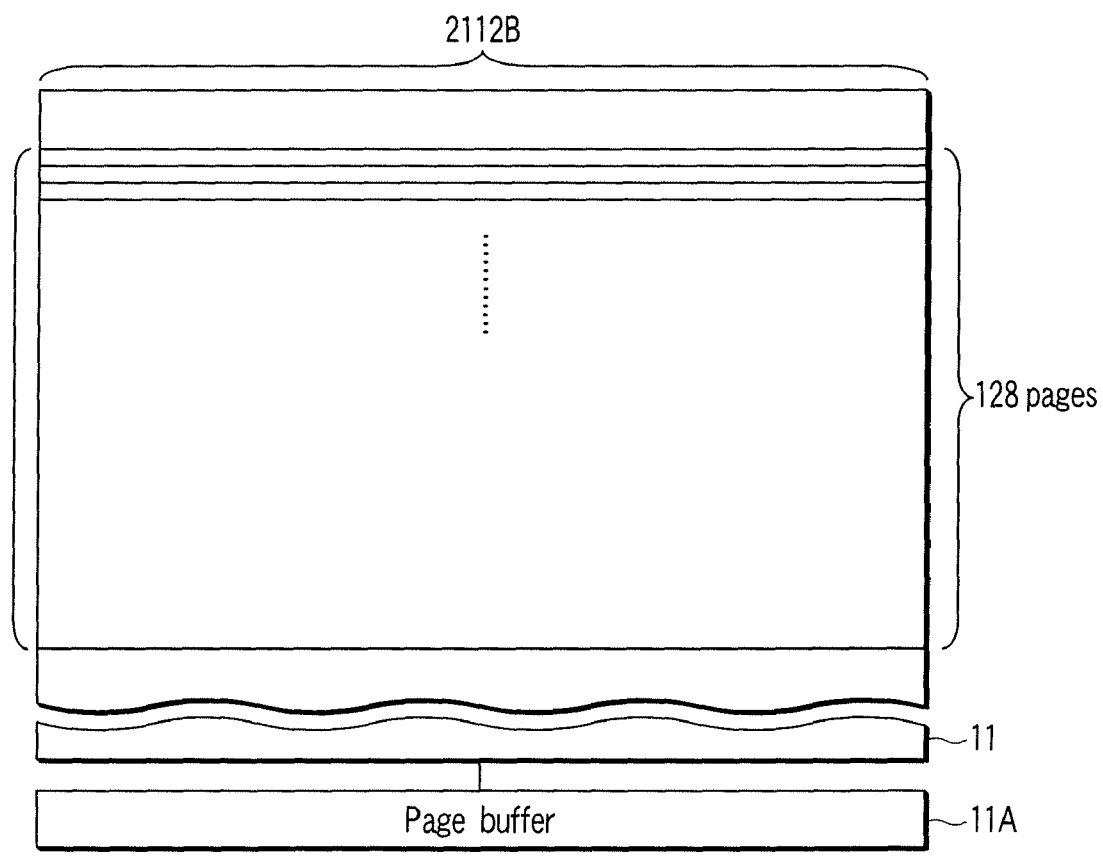
FIG. 5 is a view showing a data arrangement in an NAND type flash memory in the memory card according to the first to third embodiments.

FIG. 5 shows a data arrangement in the NAND-type flash memory 11. Each page of the NAND-type flash memory 11 has 2112 bytes, which is equal to (a data storage section of 512 bytes+a redundant section of 16 bytes)×4, and 128 pages form one erasing unit (256 kbytes+8 kbytes). It is to be noted that an erasing unit of this NAND-type flash memory 11 is assumed 256 kbytes in the following description for the convenience sake.

Further, the NAND-type flash memory 11 includes a page buffer 11A which is used to input/output data to/from the flash memory 11. A capacity of this page buffer 11A is 2112 bytes (2048 bytes+64 bytes). At the time of a data write operation or the like, the page buffer 11A carries out data input/output processing with the flash memory in units of one page corresponding to its own storage capacity.

When a capacity of the NAND-type flash memory 11 is, e.g., 1 Gbit, the number of 256-kbyte blocks (the erasing unit) is 512.

Furthermore, although FIG. 5 shows the example in which the erasing unit is a 256-kbyte block, it is also practically effective to provide a configuration in which the erasing unit is, e.g., 16-kbyte block. In this case, each page has 528 bytes (a data storage section of 512 bytes+a redundant section of 16 bytes), and 32 pages form one erasing unit (16 kbytes+0.5 kbytes [where k is 1024]).

As shown in FIG. 3, an area in which data is written in the NAND-type flash memory 11 (a data storage area) is divided into a plurality of areas in accordance with data to be stored. The NAND-type flash memory 11 includes a user data area 34, a management data area 31, a confidential data area 32 and a protection data area 33 as data storage areas.

The user data area 34 stores user data. A user of the memory card 1 can freely access and use the user data area.

The protection data area 33 mainly stores important data such as management information concerning the memory card. The host apparatus 2 can access the protection data area 33 only when validity of the host apparatus 2 is certified by mutual authentication with the host apparatus 2 connected to the memory card 1.

The management data area 31 is an area in which card information such as security information or a media ID of the memory card 1 is stored.

The confidential data area 32 stores key information used for encryption or confidential data used for authentication is stored, and the host apparatus 2 cannot access this area.

FIG. 6 shows signal allocation with respect to the signal pins in an SD 4-bit mode, an SD 1-bit mode and an SPI mode. Operation modes of the memory card are roughly classified into an SD mode and an SPI mode. In the SD mode, the memory card 1 is set to the SD 4-bit mode or the SD 1-bit mode by a bus width change command from the host apparatus 2.

Here, paying attention to four data signal pins P1 (DAT 3), P7 (DAT 0), P8 (DAT 1) and P9 (DAT 2), the four data signal pins P1, P7 and P8 and P9 are all used for data transfer in the SD 4-bit mode in which data transfer is carried out in units of four-bit width. On the other hand, in the SD 1-bit mode in which data transfer is effected in units of one-bit width, the data signal pin P7 alone is used for data transfer. The data signal pins P8 and P9 are not used at all.

In the SPI mode, the data signal pin P7 is used as a data signal line (DATA OUT) from the memory card 1 to the host apparatus 2. The command (CMD) pin P2 is used as a data signal line (DATA IN) from the host apparatus to the memory card 1. The data signal pins P8 and P9 are not used at all. Further, in the SPI mode, the data 3 pin (DAT 3) is used for transmission of a chip select signal CS from the host apparatus 2 to the memory card 1.

Figure 7:
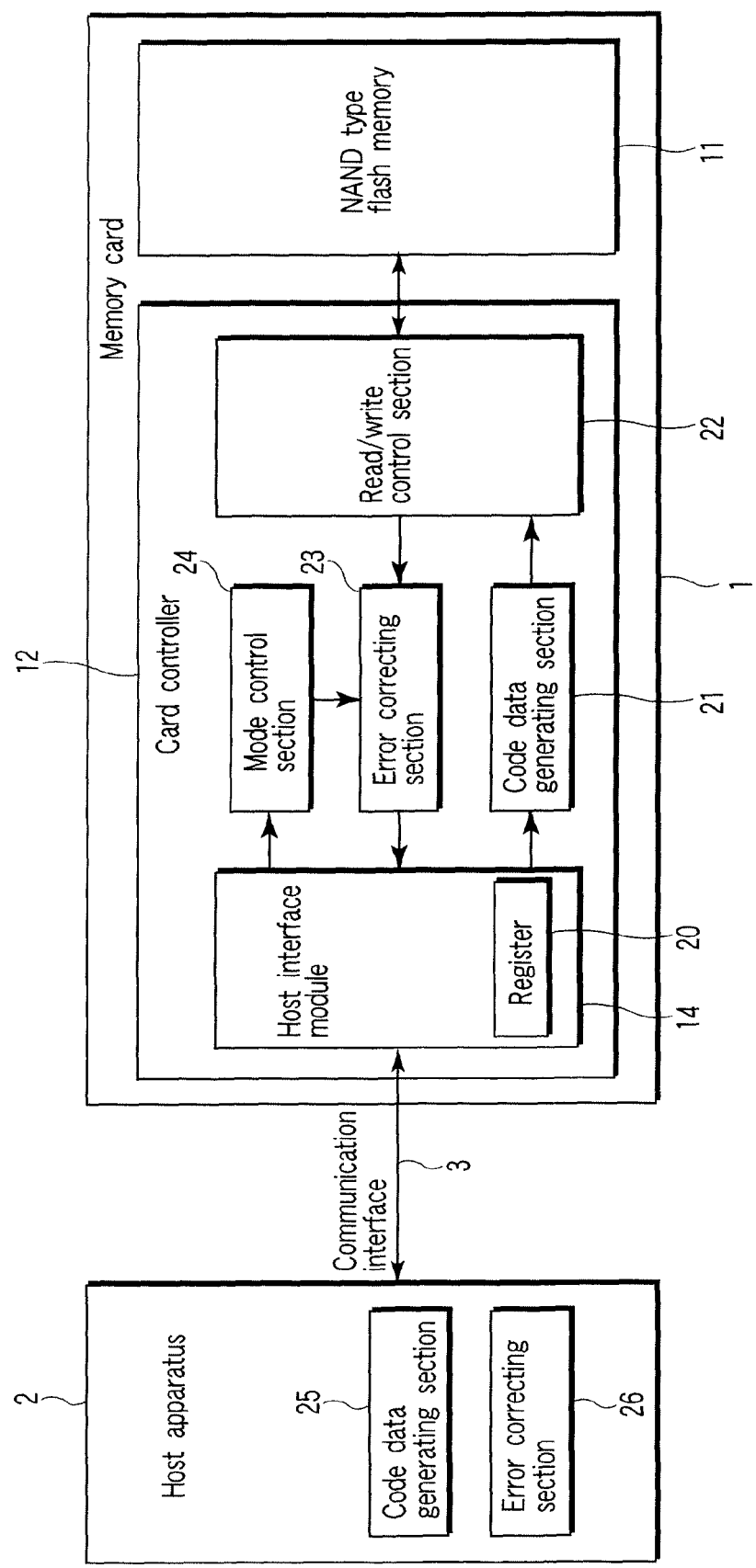
FIG. 7 is a functional block diagram showing a configuration of the memory card according to the first to third embodiments.

An operation of the memory card according to this embodiment will now be described. FIG. 7 is a functional block diagram showing a configuration of the memory card according to this embodiment.

The memory card 1 is accessed by the host apparatus 2 through the communication interface 3 and performs an operation such as writing, reading and the like. The memory card 1 has a host interface module 14, a code data generating section 21, a read/write control section 22, an error correcting section 23, and a mode control section 24.

In a case where the host apparatus 2 accesses the NAND-type flash memory 11, the host apparatus 2 transmits an access command and transfer data to the host interface module 14 through the communication interface 3. The host interface module 14 receives the access command and the transfer data from the host apparatus 2. Furthermore, the host interface module 14 decodes the access command, and instructs the MPU 15 in the read/write control section 22 to perform processing to access the NAND-type flash memory 11.

The MPU 15 has the code data generating section 21. When the host interface module 14 receives a write command, the code data generating section 21 generates an error correction code (first code data) based on the transfer data received by the host interface module 14 with the write command. The MPU 15 accesses the NAND-type flash memory 11 through a flash controller 16 in the read/write control section 22. The flash controller 16 transmits/receives code data to/from the NAND-type flash memory 11.

The MPU 15 includes the error correcting section 23 and the mode control section 24. The error correcting section 23 is a circuit which can correct an error bit included in transfer data based on the transfer data and first code data. When the host interface module 14 receives a predetermined command, the mode control section 24 sets an ECC operation mode of the memory card 1 to one of an ECC off mode (a first operation mode) and an ECC on mode (a second operation mode). The ECC off mode is an operation mode which turns off an error correcting function of the error correcting section 23, and the ECC on mode is an operation mode which turns on the error correcting function of the error correcting section 23.

When the host interface module 14 receives a read command, the flash controller 16 reads transfer data and first code data for the transfer data from the NAND-type flash memory 11. In the ECC off mode, the error correcting section 23 transmits the transfer data to the host interface module 14 without performing error correction processing. The host interface module 14 transmits the transfer data received from the error correcting section 23 to the host apparatus 2.

In the ECC on mode, the error correcting section 23 detects an error bit included in the transfer data based on the transfer data and the first code data read from the NAND-type flash memory 11. When the error bit is not included in the transfer data, the error correcting section 23 transmits the transfer data to the host interface module 14 without effecting the error correction processing.

On the other hand, when the error bit is included in the transfer data, the error correcting section 23 carries out the error correction processing. When the error correcting section 23 can correct the error bit, the error correcting section 23 corrects the error bit, and transmits the transfer data subjected to error correction to the host interface module 14. The host interface module 14 transmits the error-corrected transfer data received from the error correcting section 23 to the host apparatus 2. When the error correcting section 23 cannot correct the error bit, the error correcting section 23 does not transmit the transfer data to the host interface module 14, and stores information which indicates the error bit was not able to be corrected based on the first code data as error information in the card status register in the register section 20. The host apparatus 2 is notified of this error information in accordance with a request from the host apparatus 2.

The host apparatus 2 has a code data generating section 25 and an error correcting section 26. The code data generating section 25 generates second code data which is an error correction code based on write target data during a write operation to the memory card 1 from the host apparatus 2. It is desirable for the second code data to have a higher error correction capability than the first code data produced by the code data generating section 21. Here, the error correction capability means the number of error bits which can be corrected by using the code data.

The host apparatus 2 transmits transfer data together with a write command to the host interface module 14. This transfer data includes write target data and second code data corresponding to this data. The code data generating section 21 in the memory card 1 generates first code data based on the transfer data including the second code data.

In the ECC on mode, when an error bit is included in transfer data read from the NAND-type flash memory 11, the host interface module 14 transmits the transfer data including the error bit to the host apparatus 2. The error correcting section 26 corrects the error bit included in the transfer data based on second code data included in this transfer data.

Figure 8:
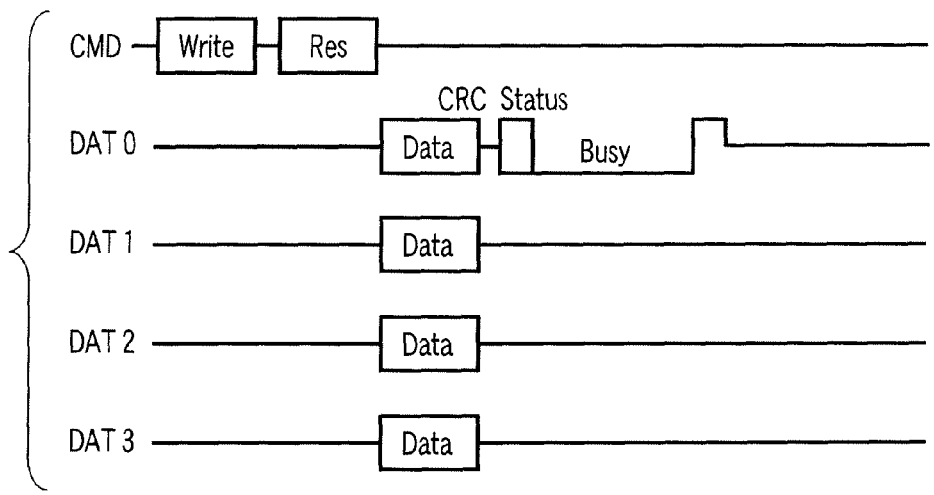
FIG. 8 is a timing chart showing transmission/reception of signals in a write operation between the memory card and a host apparatus according to the first to third embodiments.

Transmission/reception of signals in a write operation between the memory card 1 and the host apparatus 2 will now be described with reference to a timing chart of FIG. 8. Here, a description will be given on an example where the host apparatus 2 performs a single-write operation to the memory card 1. FIG. 8 is a timing chart showing transmission/reception of signals between the host apparatus 2 and the memory card 1 in the write operation, and shows timings of signals which are transmitted through the communication interface 3. In this embodiment, although a description will be given as to an example where an operation mode of the memory card 1 is the SD 4-bit mode, the present invention can be also applied to a case where the operation mode is the SD 1-bit mode and the SPI mode.

When a write command (Write) is input to the host interface module 14 from the host apparatus 2 through the command (CMD) line, a response signal (Res) is returned to the host apparatus 2 from the host interface module 14. Subsequently, a data block which is the transfer data is transferred to the host interface module 14 from the host apparatus 2 through the data 0 (DAT 0) to data 3 (DAT 3) lines. When the data block is received, the host interface module 14 returns a CRC status signal informing an error generation status indicative of whether an error is produced during data transfer to the host apparatus 2 through the data 0 line. Further, the data 0 line enters a busy (Busy) state (e.g., "L") indicating that the write operation is currently performed until this data block is written in the NAND-type flash memory 11 by the read/write control section 22.

Figure 9:
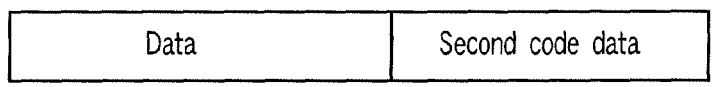
FIG. 9 is a view showing a format of a data block transmitted/received between the memory card and the host apparatus according to the first to third embodiments.

FIG. 9 shows a format of the data block transferred/received between the host apparatus 2 and the host interface module 14 through the data 0 (DAT 0) to data 3 (DAT 3) lines. As shown in FIG. 9, the data block (the transfer data) includes write target data and second code data generated by the code data generating section 25 in the host apparatus 2 based on this write target data. The code data generating section 21 in the memory card 1 generates first code data based on the transfer data including this second code data. The flash controller 16 writes the transfer data and the first code data in predetermined pages in the NAND-type flash memory 11 while the data 0 line demonstrates the busy (Busy) state. The transfer data is stored in the data storage section of 512 bytes among pages of 2112 bytes. The first code data is stored in the redundant section of 16 bytes corresponding to the data storage section where the transfer data is stored.

Transmission/reception of signals in a read operation between the memory card 1 and the host apparatus 2 will now be described. Here, a description will be given on a single-read operation by which one data block is read from the NAND-type flash memory 11 by the read/write control section 22 upon input of one read command.

Figure 10:
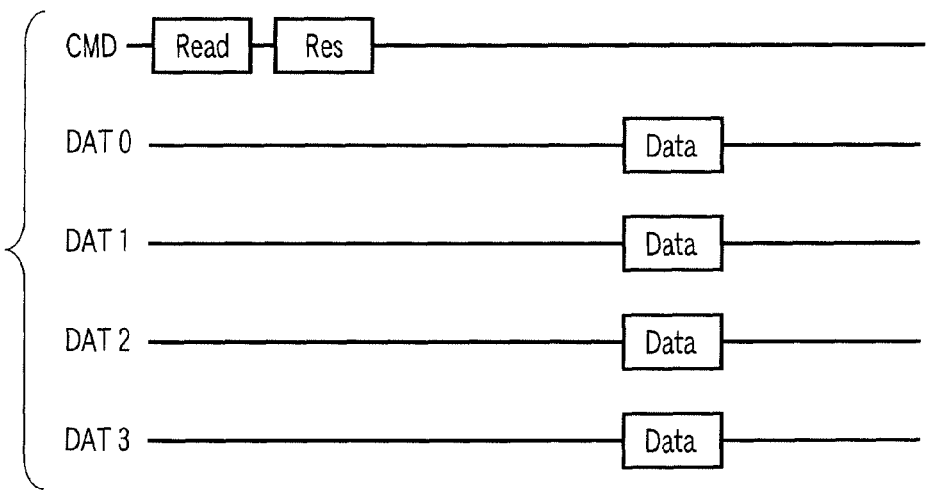
FIG. 10 is a timing chart showing transmission/reception of signals in a read operation between the memory card and the host apparatus according to the first to third embodiments.

FIG. 10 is a timing chart of transmission/reception of signals between the host apparatus 2 and the memory card 1 when the single-read operation is performed by using a four-bit data line, and shows timings of signals transmitted through the communication interface 3.

As shown in FIG. 10, when a read command R1 is input to the host interface module 13 from the host apparatus 2 through the command (CMD) line, the host interface module 13 returns a response signal to the host apparatus 2. Then, a data block including data read from the NAND-type flash memory 11 is transferred to the host apparatus 2 through the data 0 (DAT 0) to data 3 (DAT 3) lines.

The data block read from the memory card 1 by the single-read operation has the same format as the format of the data block described in conjunction with FIG. 9. That is, the transfer data includes data and second code data. When an operation mode of the memory card 1 is the ECC off mode, the error correcting section 26 in the host apparatus 2 corrects an error bit included in the transfer data based on this data and the second code data.

Figure 11:
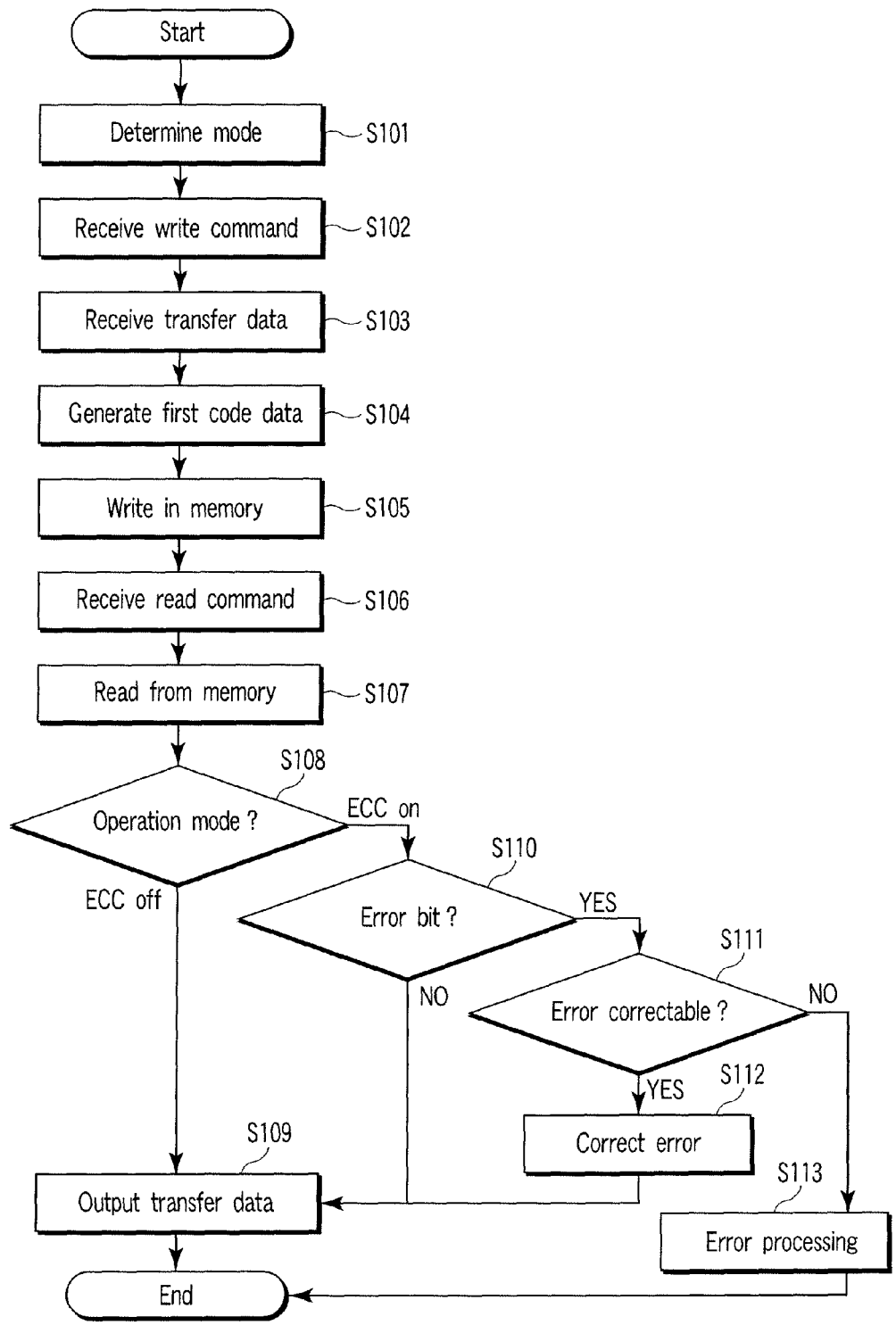
FIG. 11 is a flowchart showing an operation procedure of the memory card according to the first embodiment.

An operation procedure of the memory card 1 according to this embodiment will now be described with reference to FIG. 11. FIG. 11 is a flowchart showing an operation procedure of the memory card 1.

The memory card 1 is set in the ECC on mode in an initial state. In order to set an operation mode of the memory card 1 to the ECC off mode, the host apparatus 2 transmits a predetermined command to the host interface module 14 in the memory card 1. When the host interface module 14 receives the command, the mode control section 24 sets the operation mode of the memory card 1 to the ECC off mode. With the above-described procedure, the operation mode of the memory card 1 is set to one of the ECC off mode and the ECC on mode (step S101).

Then, data is written in the memory card 1 from the host apparatus 2. First, the host interface module 14 receives a write command from the host apparatus 2 (step S102). Moreover, the host interface module 14 receives transfer data after the write command (step S103). The code data generating section 21 generates first code data based on the transfer data received by the host interface module 14 (step S104). The flash controller 16 writes the transfer data and the first code data for the transfer data in the NAND-type flash memory 11 (step S105).

Then, data is read from the memory card 1 to the host apparatus 2. First, the host interface module 14 receives a read command from the host apparatus 2 (step S106). The flash controller 16 reads read target transfer data and first code data for this transfer data from the NAND-type flash memory 11 (step S107). Then, an operation mode of the memory card 1 is judged (step S108).

When an operation mode of the memory card 1 is the ECC off mode, the transfer data read from the NAND-type flash memory 11 is transmitted from the host interface module 14 to the host apparatus 2 without being subjected error correction processing by the error correcting section 23 (step S109).

When an operation mode of the memory card 1 is the ECC on mode, the error correcting section 23 detects an error bit included in the transfer data based on the transfer data and the first code data (step S110). When the error bit is not included in the transfer data, the host interface module 14 transmits the transfer data to the host apparatus 2 (the step S109).

When the error bit is included in the transfer data, the error correcting section 23 judges whether the error bit can be corrected based on the transfer data and the first code data (step Sill). When the error bit can be corrected, the error correcting section 23 corrects the error bit included in the transfer data (step S112). The transfer data having the corrected error bit is transmitted from the host interface module 14 to the host apparatus 2. When the error bit cannot be corrected, error processing is carried out (step S113). At the step S113, error information indicating that the error bit was not able to be corrected is stored in the card status register in the register section 20. Further, at the step S113, the transfer data is not transmitted from the host interface module 14 to the host apparatus 2.

Figure 12:
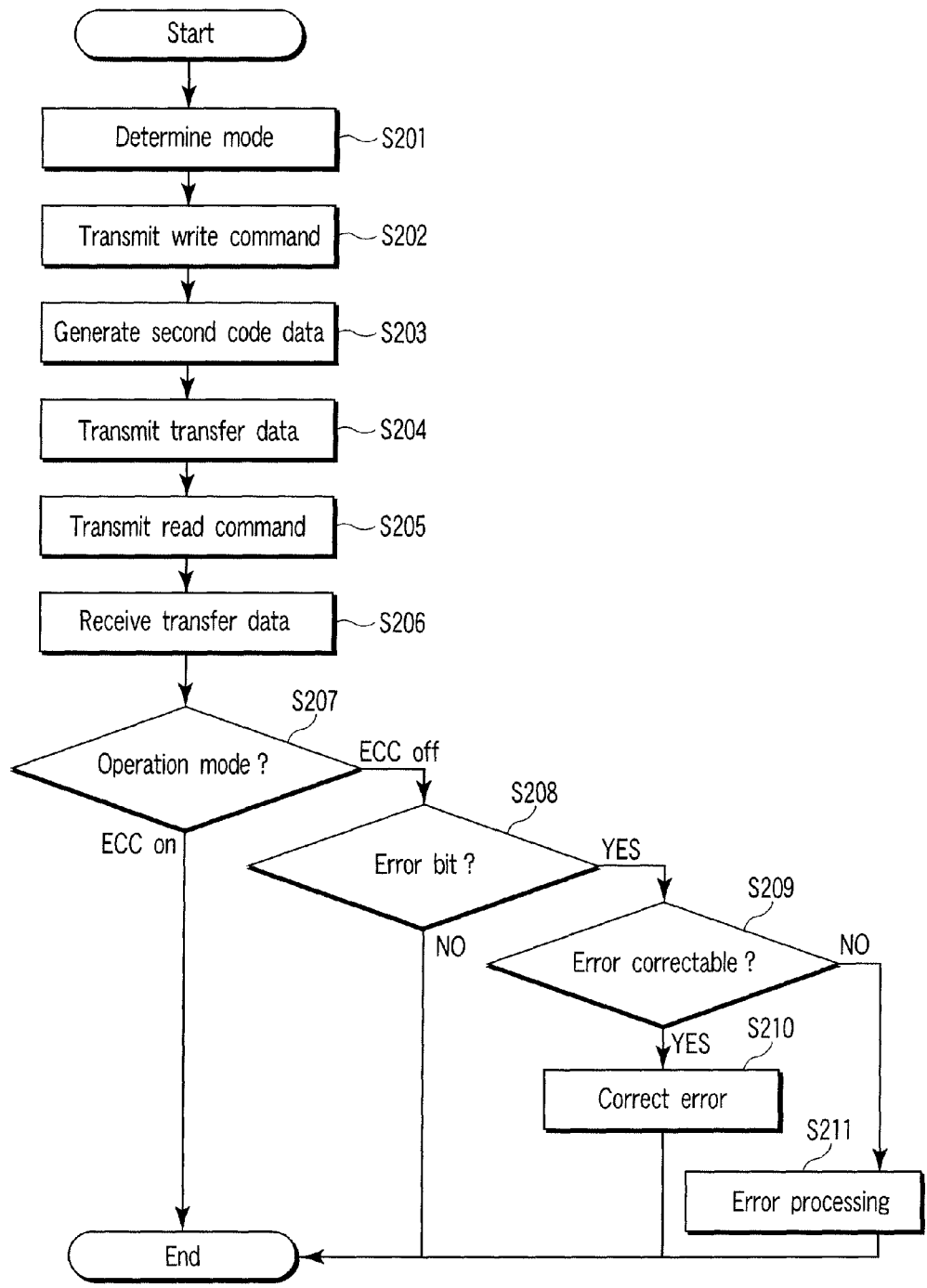
FIG. 12 is a flowchart showing an operation procedure of the host apparatus according to the first embodiment.

An operation procedure of the host apparatus 2 according to this embodiment will now be described with reference to FIG. 12. FIG. 12 is a flowchart showing the operation procedure of the host apparatus 2. FIG. 12 corresponds to the flowchart (FIG. 11) showing the operation procedure of the memory card 1.

In the initial state, the memory card 1 is set in the ECC on mode. In order to set the operation mode of the memory card 1 to the ECC off mode, the host apparatus 2 transmits a predetermined command to the host interface module 14 in the memory card 1. When the host interface module 14 receives the command, the mode control section 24 sets the operation mode of the memory cad 1 to the ECC off mode. With the above-described procedure, the operation mode of the memory card 1 is set to one of the ECC off mode and the ECC on mode (step S201).

At the step S201, it is preferable to set the operation mode of the memory card 1 to the ECC off mode when an error correction capability of the error correcting section 26 in the host apparatus 2 is higher than an error correction capability of the error correcting section 23 in the memory card 1. That is because more error bits can be corrected when the error correction capability of the error correcting section 26 in the host apparatus 2 is higher.

Then, data is written in the memory card 1 from the host apparatus 2. First, the host apparatus 2 transmits a write command to the host interface module 14 (step S202). Then, the code data generating section 25 in the host apparatus 2 generates second code data based on write target data (step S203). The host apparatus 2 transmits the write target data and the second code data for this data to the host interface module 14 in the memory card 1 as transfer data (step S204).

Then, data is read from the memory card 1 to the host apparatus 2. First, the host apparatus 2 transmits a read command to the host interface module 14 (step S205). Then, the host apparatus 2 receives transfer data including second code data from the host interface module 14 (step S206). Then, the host apparatus 2 judges an operation mode of the memory card 1 (step S207).

When the operation mode of the memory card 1 is the ECC on mode, reading data from the memory card 1 to the host apparatus 2 is normally terminated.

When the operation mode of the memory card 1 is the ECC off mode, the error correcting section 26 in the host apparatus 2 detects an error bit included in the data based on the data and the second code data (step S208). When the error bit is not included in the data, reading the data from the memory card 1 to the host apparatus 2 is normally terminated.

When the error bit is included in the data, the error correcting section 26 judges whether the error bit can be corrected based on the data and the second code data (step S209). When the error bit can be corrected, the error correcting section 26 corrects the error bit (step S210). When the error bit cannot be corrected, the host apparatus 2 deals with reading the data from the memory card 1 to the host apparatus 2 as error processing (step S211).

It is to be noted that FIGS. 11 and 12 show the flowcharts when the write operation and the read operation are continuously executed for the convenience sake. However, the operation procedures of the memory card 1 and the host apparatus 2 are not restricted thereto. For example, the memory card 1 and the host apparatus 2 may write data after reading the data. Further, the memory card 1 and the host apparatus 2 may execute one of the data write operation and the data read operation. This is also true in later-described second and third embodiments.

Furthermore, although the description has been given as to the example where the memory card 1 is set in the ECC on mode in the initial state in FIGS. 11 and 12, the memory card 1 may be set in the ECC off mode in the initial state. Moreover, the operation mode of the memory card 1 may not be set in the initial state, and the operation mode of the memory card 1 may be set by issuing a predetermined command in initialization processing of the memory card 1.

Moreover, although the description has been given as to the example where the operation mode of the memory card 1 is set in initialization processing of the memory card 1 in FIGS. 11 and 12, a timing at which the operation mode of the memory card 1 is set is not restricted to a timing of the initialization processing of the memory card 1.

As described above, in the first embodiment, transfer data is transmitted to the host apparatus 2 irrespective of whether an error in the transfer data can be corrected by the error correcting section 23 in the ECC off mode. Therefore, even when error bits included in transfer data read from the NAND-type flash memory exceed the error correction capability of the error correcting section 23 in the memory card 1, the transfer data is transmitted to the host apparatus 2 as different from the prior art. As a result, it is possible to assure a processing routine in which transfer data which cannot be corrected by the error correcting section 23 is corrected by the error correcting section 26. In particular, when the error correction capability of the error correcting section 26 is higher than the error correction capability of the error correcting section 23, more error bits can be corrected.

Second Embodiment

In the first embodiment, the operation mode of the memory card 1 is set prior to or simultaneously with the read operation, and it is not changed during a series of read processing based on a given read command. On the contrary, in the second embodiment, the operation mode is changed in accordance with progress of the read operation.

In the second embodiment, the operation mode of the memory card 1 in the initial state is set in the ECC on mode. Then, when transfer data is not returned from the memory card 1 before a predetermined time elapses after a read command is issued by the host apparatus 2 (when time out occurs in reading of data from the memory card 1 to the host apparatus 2), the operation mode of the memory card 1 is changed to the ECC off mode.

Figure 13:
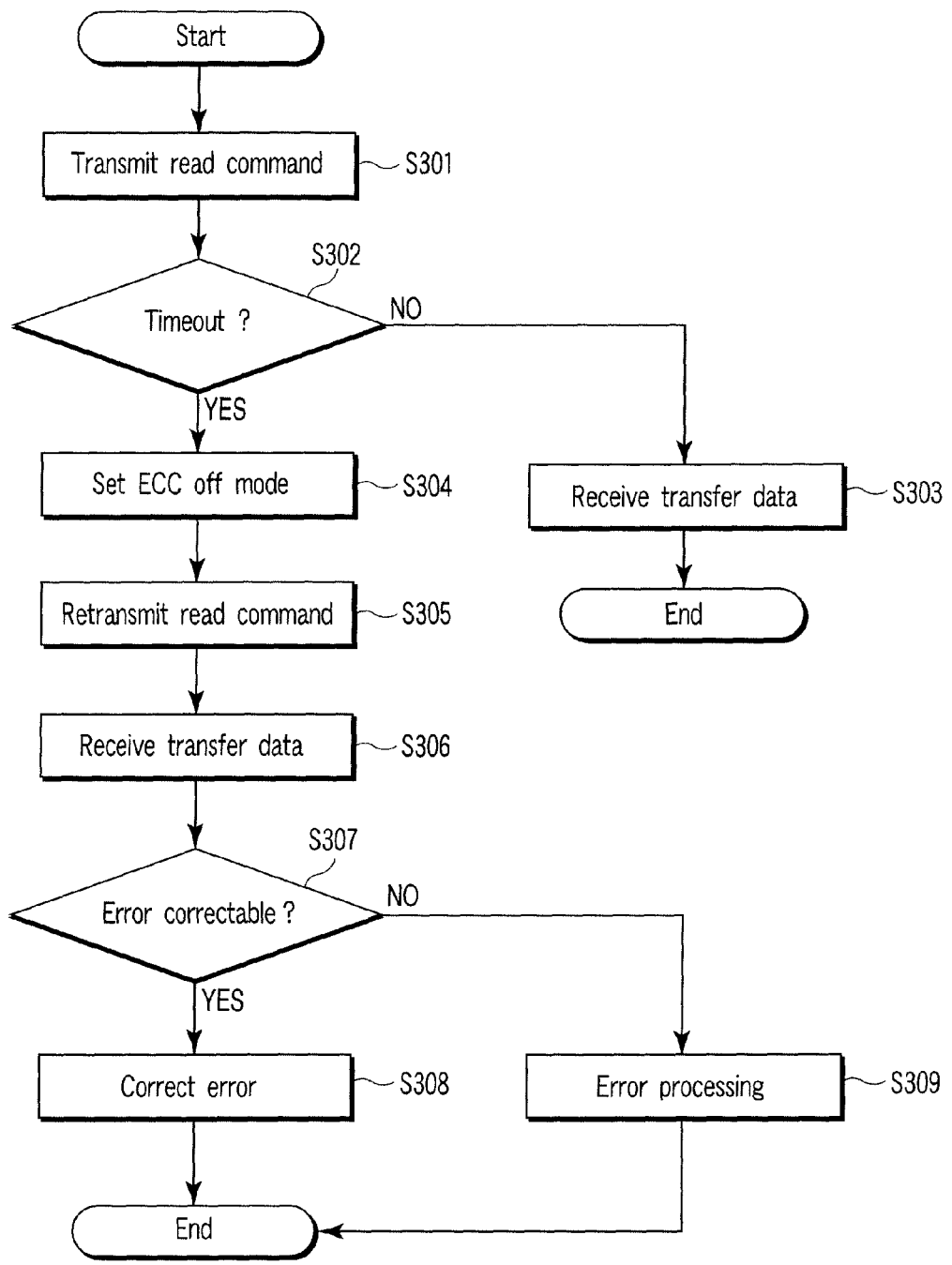
FIG. 13 is a flowchart showing an operation procedure of the host apparatus according to the second embodiment.

In the second embodiment, the configuration itself of the memory card 1 and the host apparatus 2 is the same as the first embodiment (FIGS. 1 to 10). An operation procedure alone is different. The second embodiment according to the present invention will now be described with reference to FIGS. 13 and 14. FIG. 13 is a flowchart showing an operation procedure of a host apparatus 2 according to the second embodiment of the present invention. It is to be noted that an operation procedure in the memory card 1 is the same as that in the first embodiment.

First, the host apparatus 2 transmits a read command to a host interface module 14 (step S301). Then, the host apparatus 2 judges whether transfer data is returned from a memory card 1 before a predetermined time lapses after a read command is issued at the step S301 (step S302). That is, the host apparatus 2 judges whether time out has occurred.

When time out has not occurred, transfer data is returned from the memory card 1 to the host apparatus 2 (step S303), and reading data from the memory card 1 to the host apparatus 2 is normally terminated. On the other hand, when time out has occurred, the host apparatus 2 reads error information from a card status register in a register section 20. When this error information indicates that an error bit was not able to be corrected by an error correcting section 23 in the memory card 1, the host apparatus 2 sets an operation mode of the memory card 1 to the ECC off mode (step S304).

Then, the host apparatus 2 retransmits the same command as the read command issued at the step S301 to the memory card 1 (step S305). Since the operation mode of the memory card 1 is the ECC off mode, the memory card 1 transmits transfer data through the host interface module 14 without performing error correction.

Then, the host apparatus 2 receives the transfer data from the host interface module 14 in the memory card 1 (step S306). In this transfer data, since an error bit was not able to be corrected by the error correcting section 23 in a first data read operation (the step S301), the transfer data includes the error bit. An error correcting section 26 judges whether the error bit can be corrected based on data and second code data (step S307).

When the error bit can be corrected, the error correcting section 26 corrects the error bit (step S308). When the error bit cannot be corrected, the host apparatus 2 deals with reading data from the memory card 1 to the host apparatus 2 as error processing (step S309).

With reference to FIG. 14, a description will now be given as to transmission/reception of signals between the memory card 1 and the host apparatus 2 in the operation procedure of the host apparatus 2 explained in conjunction with FIG. 13. FIG. 14 is a timing chart of transmission/reception of signals between the host apparatus 2 and the memory card 1 in the second embodiment, and shows timings of signals transmitted through a communication interface 3.

When a read command (Read) is input from the host apparatus 2 to the host interface module 13 through a command (CMD) line, a response signal (res) is returned to the host apparatus 2 from the host interface module 13. As shown in FIG. 13, when a data block (read target transfer data) is not returned before a predetermined time lapses after the read command is issued, the host apparatus 2 determines that time out has occurred in the data read operation. When this time out has occurred due to the fact that an error bit was not able to be corrected by the error correcting section 23 in the memory card 1, error information indicative of this interest is stored in the card status register in the register section 20.

Then, a command (C1) requesting information concerning an error is input to the host interface module 14 from the host apparatus 2, and a response signal (Res) is returned to the host apparatus 2 from the host interface module 14. The response signal for this command (C1) includes the error information read from the card status register. The host apparatus 2 recognizes from this error information that the error bit has not been corrected by the error correcting section 23.

Then, a command (C2) which is used to change the operation mode of the memory card 1 to the ECC off mode is input to the host interface module 14 from the host apparatus 2. When the command (C2) is input, a response signal (Res) is returned from the host interface module 14 to the host apparatus 2. A mode control section 24 in the memory card 1 sets the operation mode of the memory card 1 to the ECC off mode in accordance with the command C2.

As described above, in the second embodiment according to the present invention, the operation mode of the memory card 1 is normally set to the ECC on mode, and the operation mode of the memory card 1 is changed to the ECC off mode when the error correcting section 23 was not able to correct error bits. Therefore, when the error correcting section 23 can correct error bits, the operation mode of the memory card 1 is the ECC on mode, and the memory card 1 executes error correction processing. Accordingly, a processing burden on the host apparatus 2 can be reduced as compared with a case where the operation mode is maintained throughout read operation based on a given read command without judging whether the error correcting section 23 can correct errors.

Third Embodiment

In the first and second embodiments, the error correcting function of the error correcting section 23 is off in the ECC off mode. In the third embodiment, the error correcting section 23 executes error correction processing even in the ECC off mode.

Figure 15:
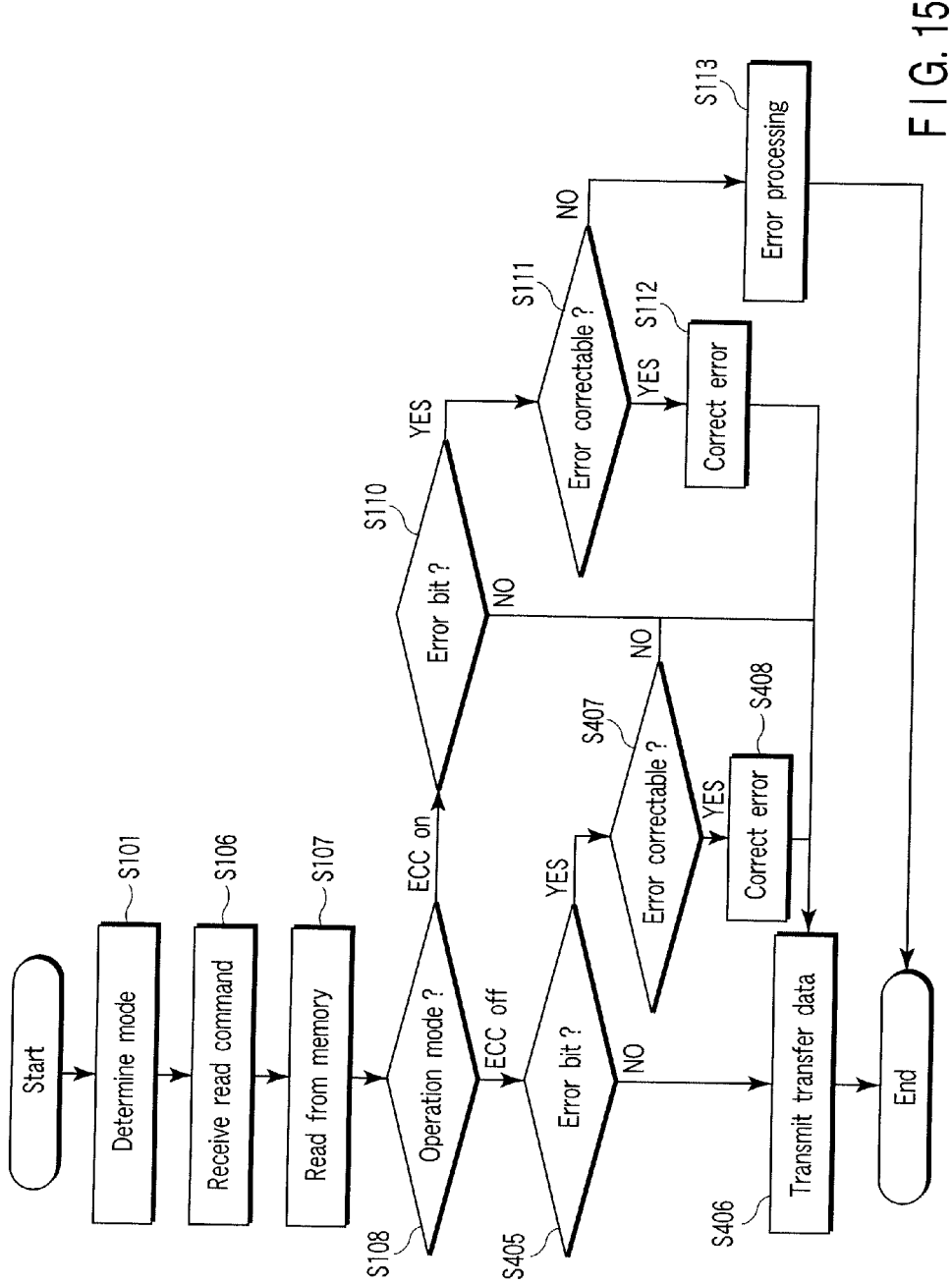
FIG. 15 is a flowchart showing an operation procedure of the memory card according to the third embodiment.

In the third embodiment, the configuration itself of a memory card 1 and a host apparatus 2 is the same as that of the first embodiment (FIGS. 1 to 10). An operation procedure alone is different. An operation procedure of the memory card 1 according to the third embodiment of the present invention will now be described with reference to FIG. 15. FIG. 15 is a flowchart showing an operation procedure of the memory card 1 according to the third embodiment of the present invention. It is to be noted that writing data from the host apparatus 2 into the memory card 1 is the same as the operation procedure described at the step S102 to the step 106 in FIG. 11, thereby eliminating the explanation here.

The memory card 1 is set in the ECC on mode in the initial state. Then, the operation mode of the memory card 1 is set to one of the ECC off mode and the ECC on mode by the same processing as the step S101. Subsequently, steps S106 and S107 are performed.

Then, a step S108 is effected. When the operation mode of the memory card 1 is the ECC on mode as a result of a judgment at the step S108, steps S110, S111, S112 and S113 are executed.

When the operation mode of the memory card 1 is the ECC off mode, an error correcting section 23 detects an error bit included in transfer data based on the transfer data and first code data (step S405). When the error bit is not included in the transfer data, a host interface module 14 transmits the transfer data to the host apparatus 2 (step S406).

When the error bit is included in the transfer data, the error correcting section 23 judges whether the error bit can be corrected based on the transfer data and the first code data (step S407). When the error bit can be corrected, the error correcting section 23 corrects the error bit included in the transfer data (step S408). The transfer data having the corrected error bit is transmitted from the host interface module 14 to the host apparatus 2.

When the error correcting section 23 cannot correct the error bit, the transfer data including the error bit is transmitted from the host interface module 14 to the host apparatus 2. Further, when the error bit cannot be corrected, error information indicating that the error bit was not able to be corrected by the error correcting section 23 in the memory card 1 is transmitted together with the transfer data to the host apparatus 2. By receiving this error information, the host apparatus 2 recognizes that the error bit is included in the transfer data received together with the error information. In this manner, even if an error which cannot be corrected by the error correcting section 23 is included in the transfer data, the transfer data can be transmitted to the host apparatus 2 by setting the memory card 1 to the ECC off mode. As a result, for example, an error correcting section 26 in the host apparatus 2 can try correcting the error.

It is to be noted that description has been given as to the example where the operation mode of the memory card 1 is set in initialization processing of the memory card 1 in FIG. 15, but a timing of setting the operation mode of the memory card 1 is not restricted to a timing of the initialization processing of the memory card 1. When time out has occurred in reading data from the memory card 1 to the host apparatus 2 like the second embodiment, the operation mode of the memory card 1 may be changed to the ECC off mode.

As described above, in the third embodiment, when the error correcting section 23 cannot correct an error bit in the ECC off mode, the host interface module 14 transmits transfer data including the error bit to the host apparatus 2. Therefore, like the first embodiment, it is possible to assure a processing routine that the error correcting section 26 corrects the transfer data which was not able to be corrected by the error correcting section 23. In particular, when an error correction capability of the error correcting section 26 is higher than an error correction capability of the error correcting section 23, more error bits can be corrected.

Furthermore, in the third embodiment, when the error correcting section 23 can correct an error bit even in the ECC off mode, the memory card 1 executes the error correction processing. Moreover, by receiving error information, the host apparatus 2 can recognize that an error bit is included in transfer data received in the ECC off mode. Therefore, the host apparatus 2 performs the error correction processing by the error correcting section 26 in the host apparatus 2 only when error information is received in the ECC off mode. Accordingly, a processing burden on the host apparatus 2 can be reduced.

In the first to third embodiments, as shown in FIG. 9, the description has been given on the example wherein transfer data is constituted of data and second code data corresponding to this data. However, a format of transfer data is not restricted thereto. The transfer data can take any format as long as it includes information which allows the host apparatus can correct error bit in the transfer data. For example, one set of transfer data may be constituted of a plurality of sets of data having the same contents. In this case, of the plurality of sets of data, data having the largest number of same contents can be regarded as correct data, thereby correcting an error bit.

Moreover, in the first to third embodiments, as shown in FIGS. 11, 12, 13 and 15, a setting of a mode and transmission or reception of a read command are independent. However, a mode may be set simultaneously with a read command. This can be realized by, e.g., setting instruction information for setting a mode in a read command.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A memory system comprising:
a code data generating section which generates code data based on write data;
a nonvolatile semiconductor memory which stores the write data and the code data for the write data and outputs read data and the code data for the read data;
an error correcting section which is configured to correct an error bit included in the read data using the read data and the code data for the read data;
an interface section which receives the write data from outside of the memory system, and outputs the read data to outside of the memory system; and
a mode control section which sets the memory system in one of a first operation mode and a second operation mode based on an instruction received from outside of the memory system, wherein,
the interface section outputs the read data which is read from the nonvolatile semiconductor memory and includes an error bit to outside of the memory system in response to a read request received from outside of the memory system in the first operation mode,
the error correcting section corrects an error bit included in the read data read from the nonvolatile semiconductor memory and the interface section outputs the read data including the error bit corrected to outside of the memory system in response to the read request in the second operation mode, and
the instruction and the read request are included in the same command.

2. The memory system according to claim 1, wherein, in a first operation mode, the interface section outputs the read data including the error bit corrected to outside of the memory system when the error correcting section is able to correct the error bit, and the interface section outputs the read data including the error bit to outside of the memory system without correcting the error bit when the error correcting section is not able to correct the error bit.

3. The memory system according to claim 1, wherein, when the error correcting section is not able to correct the error bit, the interface section outputs the read data including the error bit and an error information signal indicating that the read data includes the error bit to outside of the memory system without correcting the error bit.

4. The memory system according to claim 1, wherein, in a second operation mode, the interface section outputs the read data including the error bit corrected to outside of the memory system when the error correcting section is able to correct the error bit, and the interface section does not output the read data to outside of the memory system when the error correcting section is not able to correct the error bit.

5. The memory system according to claim 1, wherein,
the error correcting section is normally set in a second operation mode,
the interface section outputs the read data including the error bit corrected to outside of the memory system when the error correcting section is able to correct the error bit in the second operation mode, and
the interface section does not output the read data to outside of the memory system when the error correcting section is not able to correct the error bit in the second operation mode.

6. The memory system according to claim 5, wherein, when a period in which the interface section does not output the read data exceeds a set period in the second operation mode, the error correcting section is set to the first operation mode.

7. A memory system controller which controls a nonvolatile semiconductor memory mounted in a memory system, comprising:
a code data generating section which generates code data based on write data;
an error correcting section which is configured to correct an error bit included in read data using the read data and the code data for the read data which are read from the nonvolatile semiconductor memory;
an interface section which receives the write data from outside of the memory system, and outputs the read data to outside of the memory system; and
a mode control section which sets the memory system in one of a first operation mode and a second operation mode based on an instruction received from outside of the memory system, wherein,
the interface section outputs the read data which is read from the nonvolatile semiconductor memory and includes an error bit to outside of the memory system in response to a read request in the first operation mode,
the error correcting section corrects an error bit included in the read data read from the nonvolatile semiconductor memory and the interface section outputs the read data including the error bit corrected to outside of the memory system in response to the read request in the second operation mode, and
the instruction and the read request are included in the same command.

8. The memory system controller according to claim 7, wherein, in a first operation mode, the interface section outputs the read data including the error bit corrected to outside of the memory system controller when the error correcting section is able to correct the error bit, and the interface section outputs the read data including the error bit to outside of the memory system controller without correcting the error bit when the error correcting section is not able to correct the error bit.

9. The memory system controller according to claim 7, wherein, when the error correcting section is not able to correct the error bit, the interface section outputs the read data including the error bit and an error information signal indicating that the read data includes the error bit to outside of the memory system controller without correcting the error bit.

10. The memory system controller according to claim 7, wherein, in a second operation mode, the interface section outputs the read data including the error bit corrected to outside of the memory system controller when the error correcting section is able to correct the error bit, and the interface section does not output the read data to outside of the memory system controller when the error correcting section is not able to correct the error bit.

11. The memory system controller according to claim 7, wherein,
the error correcting section is normally set in a second operation mode,
the interface section outputs the read data including the error bit corrected to outside of the memory system controller when the error correcting section is able to correct the error bit in the second operation mode, and
the interface section does not output the read data to outside of the memory system controller when the error correcting section is not able to correct the error bit in the second operation mode.

12. The memory system controller according to claim 11, wherein, when a period in which the interface section does not output the read data exceeds a set period in the second operation mode, the error correcting section is set to the first operation mode.

13. A data processing method in a host apparatus into which a memory system is inserted, the memory system comprising a nonvolatile semiconductor memory and a memory system controller controlling the nonvolatile semiconductor memory, the method comprising:
providing the memory system with a mode control command which sets the memory system in one of a first operation mode and a second operation mode;
generating code data based on write data;
instructing the memory system to write the write data and the code data for the write data into the nonvolatile semiconductor memory;
instructing the memory system to read read data and the code data for the read data from the nonvolatile semiconductor memory;
judging an operation mode of the memory system; and
correcting an error bit included in the read data using the read data and the code data for the read data when the operation mode is the first operation mode, wherein,
the read data which is read from the nonvolatile semiconductor memory and includes an error bit is output from the memory system in response to a read request received from the host apparatus to the memory system in the first operation mode,
an error bit included in the read data read from the nonvolatile semiconductor memory is corrected and the read data including the error bit corrected is output from the memory system in response to a read request received from the host apparatus to the memory system in the second operation mode, and
setting the operation mode of the memory system and instructing the memory system to read read data and the code data for the read data from the nonvolatile semiconductor memory are carried out by one command.

14. The data processing method according to claim 13, further comprising:
instructing the memory system to select the second operation mode in which the memory system outputs the read data and the code data for the read data without correcting the error bit when the host apparatus does not receive the read data and the code data for the read data before a predetermined time elapses after the host apparatus instructs the memory system to output the read data and the code data for the read data; and
instructing the memory system to read the read data and the code data for the read data from the nonvolatile semiconductor memory again.

* * * * *